(12) United States Patent
Gast et al.

(10) Patent No.: US 8,902,904 B2
(45) Date of Patent: Dec. 2, 2014

(54) NETWORK ASSIGNMENT BASED ON PRIORITY

(75) Inventors: Matthew Stuart Gast, San Francisco, CA (US); Michael Paul Sale, Frisco, TX (US)

(73) Assignee: Trapeze Networks, Inc., Pleasanton, CA (US)

( * ) Notice: Subject to any disclaimer, the term of this patent is extended or adjusted under 35 U.S.C. 154(b) by 1073 days.

(21) Appl. No.: 11/852,234

(22) Filed: Sep. 7, 2007

(65) Prior Publication Data

US 2009/0067436 A1 Mar. 12, 2009

(51) Int. Cl.
*H04W 48/18* (2009.01)
*H04L 12/46* (2006.01)
*H04L 12/801* (2013.01)

(52) U.S. Cl.
CPC ........... *H04L 12/4679* (2013.01); *H04W 48/18* (2013.01); *H04L 47/10* (2013.01)
USPC .... 370/395.53; 370/329; 370/331; 455/435.2

(58) Field of Classification Search
CPC ........................... H04W 36/36; H04W 36/365
USPC ..................................................... 370/395.53
See application file for complete search history.

(56) References Cited

U.S. PATENT DOCUMENTS

| 3,641,433 | A | 2/1972 | Mifflin et al. |
| 3,906,166 | A | 9/1975 | Cooper et al. |
| 4,168,400 | A | 9/1979 | De Couasnon et al. |
| 4,176,316 | A | 11/1979 | DeRosa et al. |
| 4,247,908 | A | 1/1981 | Lockhart et al. |
| 4,291,401 | A | 9/1981 | Bachmann |
| 4,291,409 | A | 9/1981 | Weinberg et al. |
| 4,409,470 | A | 10/1983 | Shepard et al. |
| 4,460,120 | A | 7/1984 | Shepard et al. |
| 4,475,208 | A | 10/1984 | Ricketts |
| 4,494,238 | A | 1/1985 | Groth, Jr. |
| 4,500,987 | A | 2/1985 | Hasegawa |
| 4,503,533 | A | 3/1985 | Tobagi et al. |

(Continued)

FOREIGN PATENT DOCUMENTS

| EP | 0 992 921 A2 | 4/2000 |
| EP | 1 542 409 A1 | 6/2005 |

(Continued)

OTHER PUBLICATIONS

U.S. Appl. No. 11/487,722, filed Jul. 2006, Simons et al.

(Continued)

*Primary Examiner* — Ayaz Sheikh
*Assistant Examiner* — Tarell Hampton

(57) ABSTRACT

Systems and methods for network assignment based on priority are described in this application. In one aspect, a technique for network assignment based on priority relates to establishing a connection between a client and a virtual local area network (VLAN), based on an explicit or implicit network priority preference of the client. In an embodiment, multiple VLANs can be combined into one network bundle, the network bundle being a unit network for priority specification. In addition, multiple network bundles may be available for network assignment on a particular network controller (e.g., network switch). For example, the preferred network of a client may be comprised of several individual VLANs. Thus, the client can be assigned to any of the constituent VLANs included in the preferred network bundle.

15 Claims, 9 Drawing Sheets

(56) References Cited

U.S. PATENT DOCUMENTS

| | | |
|---|---|---|
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,432,842 A | 7/1995 | Kinoshita |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,670,964 A | 9/1997 | Dent |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,734,699 A | 3/1998 | Lu et al. |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,818,385 A | 10/1998 | Bartholomew |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright |
| 6,088,591 A | 7/2000 | Trompower |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,694 B1 | 2/2001 | Fine et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watanabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |

(56) References Cited

U.S. PATENT DOCUMENTS

| | | |
|---|---|---|
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 * | 10/2002 | Wilson et al. ............... 370/462 |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,574,240 B1 | 6/2003 | Tzeng |
| 6,580,700 B1 | 6/2003 | Pinard et al. |
| 6,587,680 B1 | 7/2003 | Ala-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,661,787 B1 | 12/2003 | O'Connell et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,721,548 B1 | 4/2004 | Mohindra et al. |
| 6,725,260 B1 | 4/2004 | Philyaw |
| 6,738,629 B1 | 5/2004 | McCormick et al. |
| 6,747,961 B1 | 6/2004 | Ahmed et al. |
| 6,756,940 B2 | 6/2004 | Oh et al. |
| 6,760,324 B1 | 7/2004 | Scott et al. |
| 6,785,275 B1 | 8/2004 | Boivie et al. |
| 6,798,788 B1 | 9/2004 | Viswanath et al. |
| 6,801,782 B2 | 10/2004 | McCrady et al. |
| 6,826,399 B1 | 11/2004 | Hoffman et al. |
| 6,839,338 B1 | 1/2005 | Amara et al. |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 | 2/2005 | Henry et al. |
| 6,879,812 B2 | 4/2005 | Rappaport et al. |
| 6,901,439 B1 | 5/2005 | Bonasia et al. |
| 6,917,688 B2 | 7/2005 | Yu et al. |
| 6,934,260 B1 | 8/2005 | Kanuri |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B2 | 1/2006 | Leung |
| 6,990,348 B1 | 1/2006 | Benveniste |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. |
| 7,024,199 B1 | 4/2006 | Massie et al. |
| 7,024,394 B1 | 4/2006 | Ashour et al. |
| 7,027,773 B1 | 4/2006 | McMillin |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. |
| 7,068,999 B2 | 6/2006 | Ballai |
| 7,079,537 B1 | 7/2006 | Kanuri et al. |
| 7,089,322 B1 | 8/2006 | Stallmann |
| 7,092,529 B2 | 8/2006 | Yu et al. |
| 7,110,756 B2 | 9/2006 | Diener |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B1 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow |
| 7,158,777 B2 | 1/2007 | Lee et al. |
| 7,159,016 B2 | 1/2007 | Baker |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,336,961 B1 | 2/2008 | Ngan |
| 7,349,412 B1 | 3/2008 | Jones et al. |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 | 5/2008 | Caves et al. |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,443,823 B2 | 10/2008 | Hunkeler et al. |
| 7,447,502 B2 | 11/2008 | Buckley |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 * | 1/2009 | Sinha ..................... 455/432.1 |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,519,372 B2 | 4/2009 | MacDonald et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |
| 7,592,906 B1 | 9/2009 | Hanna et al. |
| 7,603,119 B1 | 10/2009 | Durig et al. |
| 7,636,363 B2 | 12/2009 | Chang et al. |
| 7,680,501 B2 | 3/2010 | Sillasto et al. |
| 7,693,526 B2 | 4/2010 | Qian et al. |
| 7,715,432 B2 | 5/2010 | Bennett |
| 7,716,379 B2 | 5/2010 | Ruan et al. |
| 7,724,703 B2 | 5/2010 | Matta et al. |
| 7,724,704 B2 | 5/2010 | Simons et al. |
| 7,729,278 B2 | 6/2010 | Chari et al. |
| 7,733,868 B2 | 6/2010 | Van Zijst |
| 7,746,897 B2 | 6/2010 | Stephenson et al. |
| 7,788,475 B2 | 8/2010 | Zimmer et al. |

(56) References Cited

U.S. PATENT DOCUMENTS

| | | |
|---|---|---|
| 7,805,529 B2 | 9/2010 | Galluzzo et al. |
| 7,817,554 B2 | 10/2010 | Skog et al. |
| 7,844,298 B2 | 11/2010 | Riley |
| 7,865,713 B2 | 1/2011 | Chesnutt et al. |
| 7,873,061 B2 | 1/2011 | Gast et al. |
| 7,894,852 B2 | 2/2011 | Hansen |
| 7,912,982 B2 | 3/2011 | Murphy |
| 7,920,548 B2 | 4/2011 | Lor et al. |
| 7,929,922 B2 | 4/2011 | Kubo |
| 7,945,399 B2 | 5/2011 | Nosovitsky et al. |
| 7,986,940 B2 | 7/2011 | Lee et al. |
| 8,000,724 B1 | 8/2011 | Rayburn et al. |
| 8,019,082 B1 | 9/2011 | Wiedmann et al. |
| 8,019,352 B2 | 9/2011 | Rappaport et al. |
| 8,116,275 B2 | 2/2012 | Matta et al. |
| 8,150,357 B2 | 4/2012 | Aragon |
| 8,161,278 B2 | 4/2012 | Harkins |
| 2001/0024953 A1 | 9/2001 | Balogh |
| 2002/0021701 A1 | 2/2002 | Lavian et al. |
| 2002/0052205 A1 | 5/2002 | Belostotsky et al. |
| 2002/0060995 A1 | 5/2002 | Cervello et al. |
| 2002/0062384 A1* | 5/2002 | Tso .............................. 709/229 |
| 2002/0069278 A1 | 6/2002 | Forslow |
| 2002/0078361 A1 | 6/2002 | Giroux et al. |
| 2002/0080790 A1 | 6/2002 | Beshai |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0116655 A1 | 8/2002 | Lew et al. |
| 2002/0157020 A1 | 10/2002 | Royer |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018889 A1 | 1/2003 | Burnett et al. |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0019857 A1 | 1/2004 | Teig et al. |
| 2004/0025044 A1 | 2/2004 | Day |
| 2004/0029580 A1* | 2/2004 | Haverinen et al. .......... 455/426.1 |
| 2004/0030777 A1 | 2/2004 | Reedy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0143428 A1 | 7/2004 | Rappaport et al. |
| 2004/0143755 A1 | 7/2004 | Whitaker et al. |
| 2004/0165545 A1 | 8/2004 | Cook |
| 2004/0174900 A1 | 9/2004 | Volpi et al. |
| 2004/0184475 A1 | 9/2004 | Meier |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1* | 11/2004 | Chaudhry et al. ............ 345/735 |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0248557 A1* | 12/2004 | Muratsu ....................... 455/411 |
| 2004/0252656 A1 | 12/2004 | Shiu et al. |
| 2004/0255167 A1 | 12/2004 | Knight |
| 2004/0259542 A1 | 12/2004 | Viitamaki et al. |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0259597 A1 | 11/2005 | Benedetto et al. |
| 2005/0259611 A1 | 11/2005 | Bhagwat et al. |
| 2005/0270992 A1 | 12/2005 | Sanzgiri et al. |
| 2005/0273442 A1 | 12/2005 | Bennett |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1 | 4/2006 | Pirzada et al. |

(56) References Cited

U.S. PATENT DOCUMENTS

| | | |
|---|---|---|
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0173844 A1 | 8/2006 | Zhang et al. |
| 2006/0174336 A1 | 8/2006 | Chen |
| 2006/0178168 A1 | 8/2006 | Roach |
| 2006/0182118 A1 | 8/2006 | Lam et al. |
| 2006/0187878 A1 | 8/2006 | Calhoun et al. |
| 2006/0189311 A1 | 8/2006 | Cromer et al. |
| 2006/0190721 A1* | 8/2006 | Kawakami et al. ............ 713/161 |
| 2006/0193258 A1 | 8/2006 | Ballai |
| 2006/0200862 A1 | 9/2006 | Olson et al. |
| 2006/0206582 A1 | 9/2006 | Finn |
| 2006/0215601 A1 | 9/2006 | Vieugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1 | 11/2006 | Harkins |
| 2006/0268696 A1 | 11/2006 | Konstantinov et al. |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0008884 A1 | 1/2007 | Tang |
| 2007/0010248 A1 | 1/2007 | Dravida et al. |
| 2007/0011318 A1 | 1/2007 | Roth |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0054616 A1 | 3/2007 | Culbert |
| 2007/0058598 A1 | 3/2007 | Ling |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1* | 4/2007 | Iyer et al. ...................... 370/352 |
| 2007/0081477 A1 | 4/2007 | Jakkahalli et al. |
| 2007/0082677 A1 | 4/2007 | Donald Hart et al. |
| 2007/0083924 A1 | 4/2007 | Lu |
| 2007/0086378 A1 | 4/2007 | Matta et al. |
| 2007/0086397 A1 | 4/2007 | Taylor |
| 2007/0086398 A1* | 4/2007 | Tiwari ............................ 370/338 |
| 2007/0091845 A1 | 4/2007 | Brideglall |
| 2007/0091889 A1 | 4/2007 | Xiao et al. |
| 2007/0098086 A1 | 5/2007 | Bhaskaran |
| 2007/0104197 A1 | 5/2007 | King |
| 2007/0106776 A1 | 5/2007 | Konno et al. |
| 2007/0109991 A1 | 5/2007 | Bennett |
| 2007/0110035 A1 | 5/2007 | Bennett |
| 2007/0115842 A1 | 5/2007 | Matsuda et al. |
| 2007/0133494 A1 | 6/2007 | Lai et al. |
| 2007/0135159 A1 | 6/2007 | Sinivaara |
| 2007/0135866 A1 | 6/2007 | Baker et al. |
| 2007/0136372 A1 | 6/2007 | Proctor et al. |
| 2007/0150945 A1 | 6/2007 | Whitaker et al. |
| 2007/0160046 A1 | 7/2007 | Matta |
| 2007/0171909 A1 | 7/2007 | Pignatelli |
| 2007/0183375 A1 | 8/2007 | Tiwari |
| 2007/0183402 A1 | 8/2007 | Bennett |
| 2007/0189222 A1 | 8/2007 | Kolar et al. |
| 2007/0195793 A1 | 8/2007 | Grosser et al. |
| 2007/0230457 A1* | 10/2007 | Kodera et al. ................. 370/389 |
| 2007/0248009 A1 | 10/2007 | Petersen |
| 2007/0253380 A1 | 11/2007 | Jollota et al. |
| 2007/0255116 A1 | 11/2007 | Mehta et al. |
| 2007/0258448 A1 | 11/2007 | Hu |
| 2007/0260720 A1 | 11/2007 | Morain |
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1* | 12/2007 | Kanada et al. ........... 370/395.53 |
| 2007/0287390 A1 | 12/2007 | Murphy et al. |
| 2007/0291689 A1 | 12/2007 | Kapur et al. |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0013481 A1* | 1/2008 | Simons et al. ................. 370/328 |
| 2008/0014916 A1 | 1/2008 | Chen |
| 2008/0031257 A1 | 2/2008 | He |
| 2008/0039114 A1 | 2/2008 | Phatak et al. |
| 2008/0056200 A1 | 3/2008 | Johnson |
| 2008/0056211 A1 | 3/2008 | Kim et al. |
| 2008/0064356 A1 | 3/2008 | Khayrallah |
| 2008/0069018 A1 | 3/2008 | Gast |
| 2008/0080441 A1 | 4/2008 | Park et al. |
| 2008/0102815 A1 | 5/2008 | Sengupta et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0130523 A1* | 6/2008 | Fridman et al. ............... 370/259 |
| 2008/0151844 A1 | 6/2008 | Tiwari |
| 2008/0159319 A1 | 7/2008 | Gast et al. |
| 2008/0162921 A1 | 7/2008 | Chesnutt et al. |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1 | 10/2008 | Namihira |
| 2008/0261615 A1 | 10/2008 | Kalhan |
| 2008/0276303 A1 | 11/2008 | Gast |
| 2009/0010206 A1 | 1/2009 | Giaretta et al. |
| 2009/0031044 A1 | 1/2009 | Barrack et al. |
| 2009/0046688 A1 | 2/2009 | Volpi et al. |
| 2009/0059930 A1* | 3/2009 | Ryan et al. ............... 370/395.53 |
| 2009/0073905 A1 | 3/2009 | Gast |
| 2009/0131082 A1 | 5/2009 | Gast |
| 2009/0198999 A1 | 8/2009 | Harkins |
| 2009/0247103 A1 | 10/2009 | Aragon |
| 2009/0252120 A1 | 10/2009 | Kim et al. |
| 2009/0257437 A1 | 10/2009 | Tiwari |
| 2009/0260083 A1 | 10/2009 | Szeto et al. |
| 2009/0274060 A1 | 11/2009 | Taylor |
| 2009/0287816 A1 | 11/2009 | Matta et al. |
| 2009/0293106 A1 | 11/2009 | Peden, II et al. |
| 2010/0002610 A1 | 1/2010 | Bowser et al. |
| 2010/0024007 A1 | 1/2010 | Gast |
| 2010/0040059 A1 | 2/2010 | Hu |
| 2010/0067379 A1 | 3/2010 | Zhao et al. |
| 2010/0142478 A1 | 6/2010 | Forssell et al. |
| 2010/0159827 A1 | 6/2010 | Rhodes et al. |
| 2010/0172276 A1 | 7/2010 | Aragon |
| 2010/0180016 A1 | 7/2010 | Bugwadia et al. |
| 2010/0195549 A1 | 8/2010 | Aragon et al. |
| 2010/0261475 A1 | 10/2010 | Kim et al. |
| 2010/0271188 A1 | 10/2010 | Nysen |
| 2010/0329177 A1 | 12/2010 | Murphy et al. |
| 2011/0128858 A1 | 6/2011 | Matta et al. |
| 2011/0158122 A1 | 6/2011 | Murphy et al. |
| 2012/0140705 A1 | 6/2012 | Matta et al. |
| 2012/0144462 A1 | 6/2012 | Pochop |

FOREIGN PATENT DOCUMENTS

| | | |
|---|---|---|
| GB | 2 329 801 | 3/1999 |
| GB | 2429080 | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO94/03986 | 2/1994 |
| WO | WO99/11003 | 3/1999 |
| WO | WO 00/06271 A1 | 2/2000 |
| WO | WO 00/18148 | 3/2000 |
| WO | WO 02/089442 A1 | 11/2002 |

(56) References Cited

FOREIGN PATENT DOCUMENTS

| WO | WO 03/085544 A1 | 10/2003 |
|---|---|---|
| WO | WO 2004/013986 A1 | 2/2004 |
| WO | WO 2004/095192 A2 | 11/2004 |
| WO | WO 2004/095800 A1 | 11/2004 |
| WO | WO 2006/014512 A2 | 2/2006 |
| WO | WO 2010/130133 A1 | 11/2010 |

OTHER PUBLICATIONS

U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/944,346, filed Nov. 2007, Gast, Mathew S.
U.S. Appl. No. 11/966,912, filed Dec. 2007, Chestnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Puttini, R., Percher, J., Me, L., and de Sousa, R. 2004. A fully distributed IDS for Manet. In *Proceedings of the Ninth international Symposium on Computers and Communications* 2004 vol. 2 (Iscc"04)—vol. 02 (Jun. 28-Jul. 1, 2004). ISCC. IEEE Computer Society, Washington, DC, 331-338.
U.S. Appl. No. 11/326,966, filed Jan. 2006, Taylor.
U.S. Appl. No. 11/330,877, filed Jan. 2006, Matta.
U.S. Appl. No. 11/331,789, filed Jan. 2006, Matta et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445.750, filed May 2006, Matta.
U.S. Appl. No. 11/417,840, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387 filed May 2006, Zeldin et al.
U.S. Appl. No. 11/437,582, filed May 2006, Bugwadia et al.
U.S. Appl. No. 11/451,704, filed Jun. 2006, Riley.
Acampora and Winters, IEEE Communications Magazine, 25(8):11-20 (1987).
Acampora and Winters, IEEE Journal on selected Areas in Communications. *SAC*-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).

LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
International Search Report PCT/US2007/19696 dated Feb. 29, 2008; p. 1.
International Search Report PCT/US2008/010708 dated May 18, 2009; p. 1-2.
Law, A., "New Service Discovery Protocol," Internet Citation [Online] XP002292473 Retrieved from the Internet: URL:/http://sern.uccalgary.ca/{ lawa/SENG60921/arch/SDP.htm> [retrieved Aug. 12, 2004] the whole document.
Non-Final Office Action Mailed Jun. 1, 2010, in Co-pending U.S. Appl. No. 12/172,195, filed Jul. 11, 2008.
Notice of Allowance mailed Jun. 23, 2010, in Co-pending U.S Appl. No. 11/648,359, filed Dec. 28, 2006.
Non-Final Office Action Mailed May 14, 2010, in Co-pending U.S. Appl. No. 11/845,029, filed Aug. 24, 2007.
Co-pending U.S. Appl. No. 11/648,359, filed Dec. 28, 2006.
Co-pending U.S. Appl. No. 11/845,029, filed Aug. 24, 2007.
Co-pending U.S. Appl. No. 11/970,484, filed Jan. 7, 2008.
Co-pending U.S. Appl. No. 12/077,051, filed Mar. 14, 2008.
Co-pending U.S. Appl. No. 12/113,535, filed May 1, 2008.
Co-pending U.S. Appl. No. 12/172,195, filed Jul. 11, 2008.
Co-pending U.S. Appl. No. 12/210,917, filed Sep. 15, 2008.
Final Office Action Mailed Jan. 25, 2010, in Co-pending U.S. Appl. No. 11/845,029, filed Aug. 24, 2007.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).
P. Bahl et al., RADAR: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.

(56) References Cited

OTHER PUBLICATIONS

Kleine-Ostmann, T., et al., "A Data Fusion Architecture for Enhanced Position Estimation in Wireless Networks," IEEE Communications Letters, vol. 5(8), Aug. 2001, p. 343-345.
Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless LAN Mobility System: Wireless LAN Switch and Controller Configuration Guide, 3COM, Revision A, Oct. 2004, 476 pages.
3COM, Wireless LAN Switch Manager (3WXM), 3COM, Revision C, Oct. 2004, 8 pages.
3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).
Information Sciences Institute, RFC-791—Internet Protocol, DARPA, Sep. 1981.
U.S. Appl. No. 12/603,391, filed Oct. 21, 2009.
U.S. Appl. No. 12/763,057, filed Apr. 19, 2010.
U.S. Appl. No. 13/006,950, filed Jan. 14, 2011.
U.S. Appl. No. 09/866,474, filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 11/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.

(56) References Cited

OTHER PUBLICATIONS

Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
Sangheon Pack et al. "Fast-handoff support in IEEE 802.11 wireless networks," IEEE Communications Surveys, IEEE, NY, NY, vol. 9, No. 1, Jan. 1, 2007 (pp. 2-12) ISSN: 1553-877X.
U.S. Appl. No. 13/447,656, filed Apr. 16, 2012.
U.S. Appl. No. 13/396,124, filed Feb. 14, 2012.
U.S. Appl. No. 13/437,669, filed Apr. 2, 2012.
U.S. Appl. No. 13/437,673, filed Apr. 2, 2012.
Final Office Action for U.S. Appl. No. 12/489,295, mailed Jan. 18, 2012.
Office Action for U.S. Appl. No. 11/351,104, mailed Feb. 15, 2012.
Office Action for U.S. Appl. No. 13/396,124, mailed May 7, 2012.
Office Action for U.S. Appl. No. 12/370,562, mailed Jan. 17, 2012.
Office Action for U.S. Appl. No. 13/437,669, mailed May 30, 2012.
Office Action for U.S. Appl. No. 13/437,673, mailed May 30, 2012.
Office Action for U.S. Appl. No. 12/683,281, mailed Jan. 20, 2012.
Final Office Action for U.S. Appl. No. 12/304,100, mailed Feb. 2, 2012.
Office Action for U.S. Appl. No. 12/304,100, mailed May 29, 2012.
Final Office Action for U.S. Appl. No. 12/077,051, mailed Oct. 25, 2011.
Final Office Action for U.S. Appl. No. 12/113,535, mailed Jan. 3, 2012.
Office Action for U.S. Appl. No. 12/113,535, mailed Apr. 20, 2012.
Office Action for U.S. Appl. No. 11/970,484, mailed Jun. 20, 2012.
Final Office Action for U.S. Appl. No. 12/336,492, mailed Jun. 15, 2012.
Office Action for U.S. Appl. No. 12/210,917, mailed Dec. 5, 2011.
Extended Search Report for European Application No. 11188566.1, mailed Jan. 30, 2012.
Second Office Action for Chinese Application No. 200780029623.X, mailed Mar. 7, 2012.
Extended Supplementary European Search Report for Application No. 07796005.2, mailed Feb. 14, 2012.

\* cited by examiner

NETWORK ASSIGNMENT BASED ON PRIORITY

BACKGROUND

Different networks may be provided by different physical sets of infrastructure. For example, in a local area network (LAN), workstations and/or computing devices are typically connected to a network and to each other via a router, a switch, a hub, and/or repeaters. The networks are typically supported and managed by different physical network controllers.

However, wireless technology has introduced the ability to provide different networks with logically distinct networks associated with one physical infrastructure. In addition, the logically distinct networks (e.g., VLANs) can also be comprised of groups of devices and/or users physically connected to different local area networks (LANs) thus enabling devices connected to physically distinct networks to communicate with one another, for example, as if they reside on the same physical network.

Each logical network can be maintained separately. For example, each VLAN can be updated with different data sets and has a different user access list detailing conditions for access. By allocating logical networks based on relevant users, complexity in hardware requirements can be relieved and overhead network traffic may be reduced and can be useful where network traffic is caused by large amounts of mass distributions and multi-casting since logical networks (e.g., VLANs) prevent data transmission via redundant routes and/or destinations. Furthermore, since VLANs utilize switches rather than routers to separate a network into multiple broadcast domains, the inefficiency introduced by routers is decreased.

The foregoing examples of the related art and limitations related therewith are intended to be illustrative and no exclusive. Other limitations of the related art will become apparent to those of skill in the art upon a reading of the specification and a study of the drawings.

SUMMARY OF THE DESCRIPTION

One or more techniques for network assignment based on priority are described here. Some embodiments of the present disclosure are summarized in this section. The following embodiments and aspects thereof are described in conjunction with systems, tools, and methods that are meant to be examples of an illustrative, and not limiting in scope.

In one aspect, a technique for network assignment based on priority relates to establishing a connection between a client and a virtual local area network (VLAN), based on an explicit or implicit network priority preference of the client. In an embodiment, multiple VLANs can be combined into one network bundle, the network bundle being a unit network for priority specification. In addition, multiple network bundles may be available for network assignment on a particular network controller (e.g., network switch). For example, the preferred network of a client may be comprised of several individual VLANs. Thus, the client can be assigned to any of the constituent VLANs included in the preferred network bundle.

In another aspect, the present disclosure further relates to maintaining VLAN associations of a client across a group of network controllers, the group of network controllers are referred to herein as a 'persistent group', regardless of the availability of a higher ranked VLAN on the client's priority list across different network controllers in the persistent group. In one embodiment, the association of a client with a VLAN can be maintained when the client roams to a region within the access point of different network controller, as long as the VLAN is available for connection, regardless of the user's priority list. In one aspect, the present disclosure further relates to establishing a connection with a preferred VLAN that is not available on a local network controller via tunneling, to the preferred VLAN that is available for connection on another network controller within a tunnel group. The client (e.g., user) can specify, in the network priority preference data, for example, whether a connection to a particular VLAN is to be maintained via tunneling when the VLAN is not available for connection on a local network controller. Furthermore, the VLANs can be specified, by network administrators, for example whether or not tunneled connections are accepted for the VLANs.

The present disclosure includes methods and systems which perform these methods, including processing systems which perform these methods, and computer readable media which when executed on processing systems cause the systems to perform these methods. Other features of the present disclosure will be apparent from the accompanying drawings and from the detailed description which follows.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Figure 1:
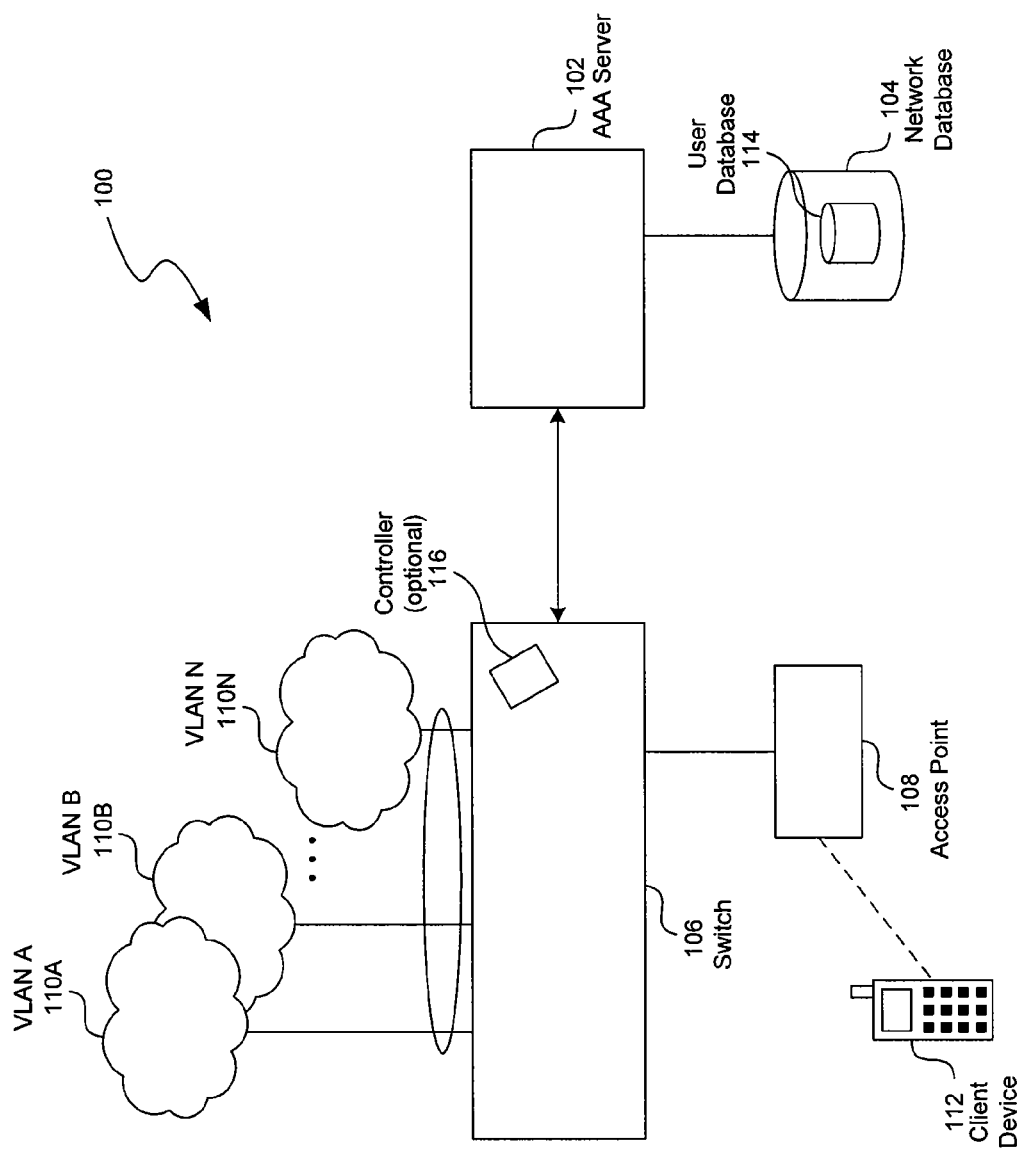
FIG. 1 illustrates an example of an implementation of a wireless local area network (WLAN) having multiple virtual local area networks (VLANs).

FIG. 1 illustrates an example of an implementation of a wireless local area network (WLAN) 100 having multiple virtual local area networks (VLANs) 110A-N.

In the example of FIG. 1, the WLAN system 100 includes an authentication, authorization, and accounting (AAA) server 102, a network database 104, a network switch 106, an access point 108, and virtual local area networks (VLANs) 110A-N. The network switch 106, in the example of FIG. 1 manages a first set of VLANs 110A-N that is available for connection via the first access point 108. The network switch 106 can be, for example, operationally connected to an authentication server (e.g., the AAA server 102) and an access point 108. The AAA server 102 can in some instances, be coupled to the network database 104. In other embodiments, the network database 104 can be internal to the AAA server 102. The AAA server 102 can include data corresponding to a particular wireless station, or a number of wireless stations.

The AAA server 102 may also include data of authentication such as keys, authorization data such as access lists and VLAN association information (e.g., for network security), whether or not a user is permitted to connect to a particular switch and/or access point, and accounting data, such as a complete or incomplete session history including roams, total packets sent, error packets, etc. In some embodiments, AAA data corresponding to a wireless station can be stored at the network switch 106. Further, the AAA data can be transferred to other switches (not shown in the example of FIG. 1). This, the AAA server 102 may or may not be present for the implementation of the novel aspects of the art described herein.

RFC 2904 due to Vollbrecht, et al., which is incorporated herein by reference, shows frameworks for authorization in the typical context of AAA for a network. Thus authorization framework can be applied to both wired and wireless users. Further, in the case of wireless users, the operations described in RFC 2904 may be preceded by other operations specific to establishing a wireless connection. For instance, in 802.11 wireless networks, the preliminary operations may include an 802.11 association request from the wireless client device, identifying the client device by a hardware (e.g., MAC) address. The user's name, password, and/or other AAA parameters can be exchanged after the association request has been accepted.

The 802.11 association request may further include a Service Set ID (SSID) to identify a wireless service to which the client wishes to connect. If the service equipment supports multiple subnets of VLANs, a common (although not mandatory) implementation choice is to identify an SSID with the VLANs. The user's request to be associated through a given SSID may imply that the subsequent authorization processing can connect the user to the VLAN that corresponds to the particular SSID.

The WLAN system 100 may or may not include WLAN intelligence distributed in a known or other manner to efficiently utilize network resources. The intelligence may extend to the edge of the network for, by way of example, but not limitation, authentication, authorization, and traffic prioritization. In this example, the network switch 106 is external to the access point 108 and may be operatively configured to communicate with one or more access points. One network switch 106 is shown in the figure, however, in practice, implementation can be achieved with multiple network controllers.

The network switch 106 may include, by way of example but not limitation, a TRAPEZE MOBILITY EXCHANGE® (MX®) switch.

In the example of FIG. 1, in operation, the access point 108 receives a request from a client device 112 to connect to a VLAN. The request can be facilitated in any convenient and/or known manner, manual or automatic, such as, logging into the network, connecting to the network via a wired or wireless connection, being detected by network components, attempting to use network resources, etc. The log-in request can be received by any convenient and/or known device on a network, including a switch, access point, router, computer, laptop, server, etc. The log-in request can be placed by the client device and/or any other device that is able to connect to a network. In an embodiment, the client device 112 can be wired or wireless and the network switch 106 can provide wired or wireless access.

In the example of FIG. 1, in operation, after the client device 112 attempts to log-on to a VLAN, the network switch 106, and/or the controller 116 (which may or may not be needed for operation) queries the network database 104 for VLAN information and/or user information. In some instances, the user information may be stored in a user database 114, which may be coupled to the network database 104, integrated with the network database as shown in the example FIG. 1, or coupled to the network switch 106. The network switch 106 and/or a controller 116 on the network switch perform a lookup in the network database 104 and/or the user database 114. The network database 104 and/or the user database 114 can relay the information to the network switch and/or the controller. The VLAN information may further provide that the VLAN is supported on the network switch and/or that the client device 112 is authorized on the VLAN. Based on the information received, such as the client's priority preference for connecting to networks, the network switch 106 establishes a connection between the connection of the client device 112 and a VLAN. In a further example, the VLAN information may provide that the tunnel affinity for VLAN A is higher than the tunnel affinity for VLAN B.

In one embodiment, the system further includes a second network switch associated with a second set of VLANs that are available for connection via a second access point coupled to the second network switch. The second network switch may be operationally coupled to an authentication server (e.g., an AAA server), and a database (e.g., a network database and/or a user database) that is operatively accessible by the second network switch. When the client 112 roams to within a range of the second access point, the client attempts to connect to a VLAN of the second set of VLANs, the network switch performs a lookup in the network database to identify a preferred VLAN of the second set of VLANs associated with the second network switch based on the network priority preference data of the client. Based on the identification, the client can be connected to the preferred VLAN of the second set of VLANs. In one embodiment, the preferred VLAN is a highest ranked VLAN that is available for connection via the second access point.

Figure 2:
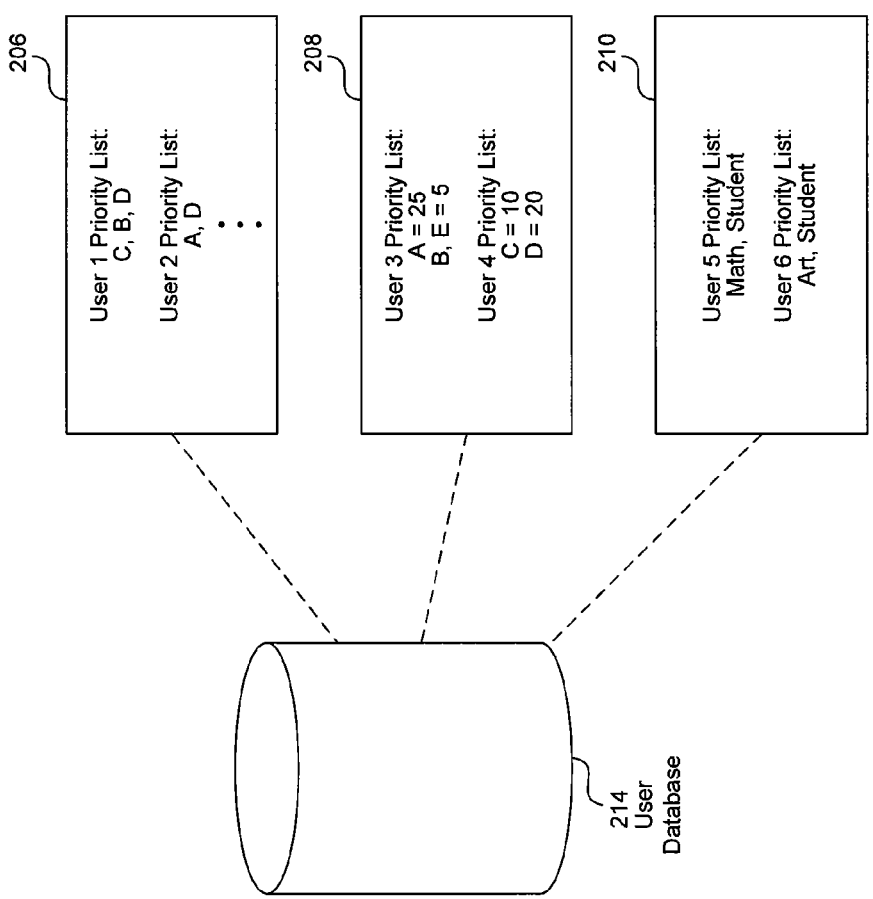
FIG. 2 illustrates an example of representations of network priority preference data of one or more clients in a user database.

FIG. 2 illustrates an example of representations of network priority preference data of one or more users in a user database 214.

A network database may include information such as, but not limited to, VLAN information, tunnel affinity information, IP addresses for switches, clients on the WLAN, and/or the VLAN, MAC addresses for switches, clients on the WLAN, and/or the VLAN log-in information, network permissions, network priority preference data of clients, priority preference data of VLAN, and/or other related client and client device information, etc. In another embodiment, the network database can be a forwarding database, such as is described in co-pending U.S. application Ser. No. 11/351,104 entitled "System and Method for Network Integrity," filed Feb. 8, 2006, which is incorporated herein by reference.

In the example of FIG. 2, the user database 214 includes network priority preference data of clients, in other words, the client's preferences to connect to different VLANs. The client's priority can be represented in a number of ways. In the embodiment shown in the figure, the priority for a VLAN can be represented in a priority list 206. In addition, the preference to connect to a VLAN can be represented quantitatively as in 208 by assigning a score to the VLANs that the client wishes to connect to. The network priority preference data can be entered by clients, network administrators, or automatically based on client information and attributes.

The user database 214 can be populated by relaying network information from switches over a WLAN, such as the WLAN 100, and storing the network information in the user database 214. In one embodiment, the user database 214 can be duplicatively stored on any number of switches in the network, for example. Additionally, the user database 214 may be distributed and shared among the switches in the network, as opposed to stored in a central location.

Since different user groups (e.g., clients) frequently have needs to access different sets of data and/or services on a network, network resources can be more efficiently allocated through VLANs for resource sharing and distribution. In one embodiment, a client can indicate data/service requests and preferences can be mapped to a particular VLAN accordingly. Thusly, the client's network priority preference may be implicit by way of the client's membership in a group or department. For example, a student enrolled in an advanced calculus class may automatically be assigned to the VLAN associated with the advanced calculus class, as indicated by network priority preference data, to provide controlled access to course materials. An employee in the accounting department may be assigned to a VLAN available for accessing auditing data, of which, another employee not in the accounting department would otherwise not have access to.

In the example of FIG. 2, a user's network priority preference data 210 can be implicitly indicated by the user's membership in a particular user group of department. As shown, user 5 is a student and is in the math class. Thus, if both math and student networks are available, and if only the math network is available, user 5 would be assigned to the math network. However, if only the student network is available, user 5 can be assigned to the student network.

In another embodiment, the client's network priority preference may be explicitly stated by way of indicating a preference for a particular network over another. For example, one may explicitly state the preference to connect to a VLAN to access a printer that is closer by, rather than further away. The network priority preference can include a list of one or more VLANs with a priority indicator that quantitatively represents the preference of a client to connect to a particular VLAN. The network priority preference can, in some embodiments, further include an indicator, such as a score, for the VLANs assigned by the client, a network administrator, a group manager, and/or automatically. The network priority preference may also, in some embodiments, be represented as a list of the VLANs in the order of preference for connection.

Network priority preference data can further be utilized to indicate a VLAN's preference to connect to users. For example, a VLAN may prefer connect to client devices coupled to a local switch via a local access point, rather than to connect to a client device coupled to a remote switch, via tunneling. Additionally, VLAN preference may be utilized to indicate an existing load on a particular network for the purposes of load balancing, to spread traffic between operative networks for optimal resource utilization. For example, a network with a light traffic load may be represented with a higher priority score than a network with a heavy traffic load. Thus, when assigning client devices to networks, the priority score of the networks may be added to the clients' preference scores to determine the final assignments. Other methods and/or algorithms for load balancing can be contemplated and implemented and do not deviate from the spirit of the novel art of this disclosure. In the example of FIG. 2, the priority list as represented in 208, user 3 is shown to have the same preference for VLAN B and VLAN E. In such a situation, for the purposes of load balancing, user 3 may be assigned to the network of VLAN B and VLAN E with a lower traffic load, if VLAN A is unavailable.

Figure 3:
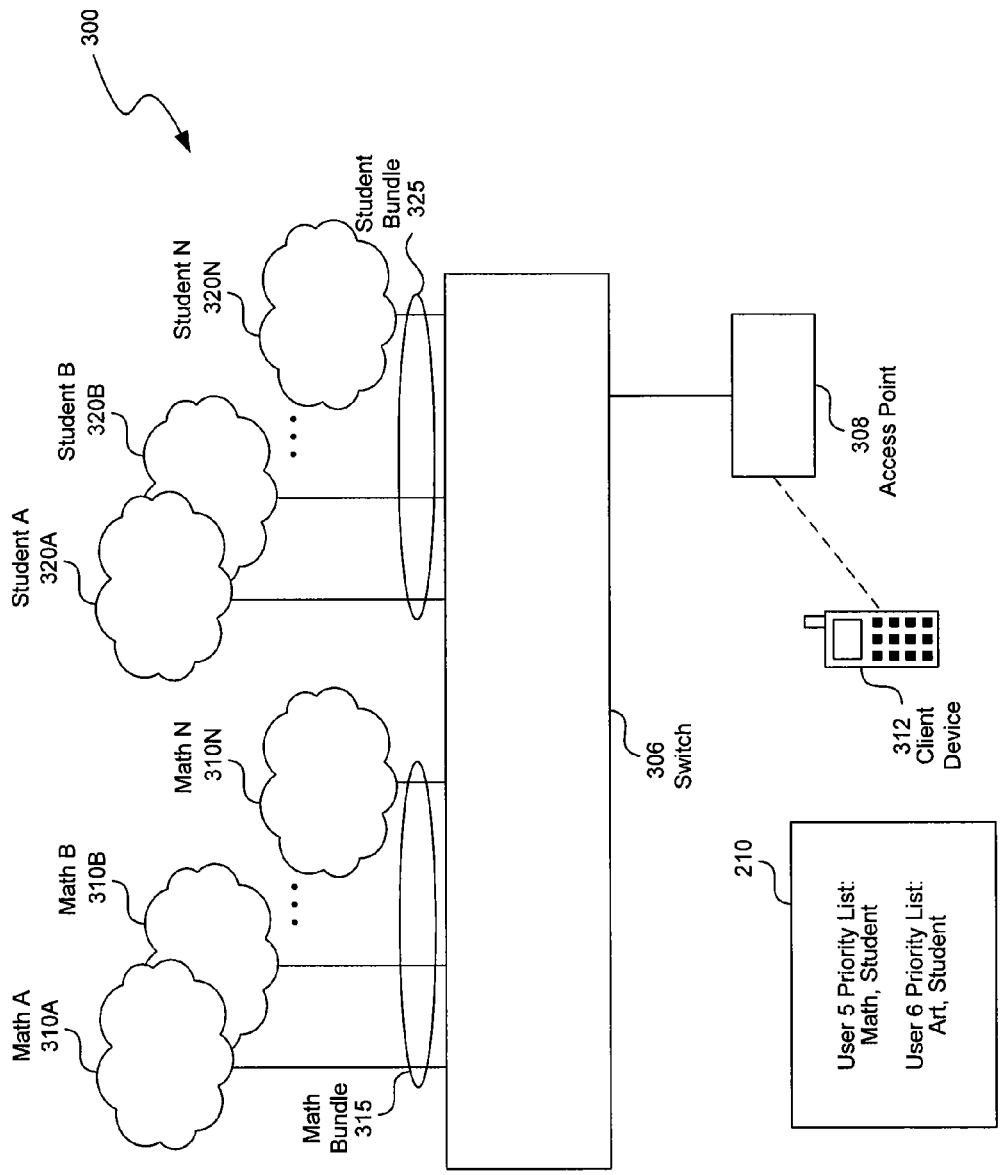
FIG. 3 illustrates an example of an implementation of a wireless local area network (WLAN) having a plurality of bundles of virtual local area networks (VLANs).

FIG. 3 illustrates an example of an implementation of a wireless local area network (WLAN) 300 having a plurality of bundles 315 and 325 of virtual local area networks (VLANs) 310A-N and 320A-N respectively.

Client preference for networks can be specified for individual VLANs, in one embodiment, as shown in priority lists 206 and 208 of FIG. 2. In addition, client preference for connection to networks can be specified for a VLAN bundle, such as the VLAN 'Math Bundle' 315 including VLANs 310A-N the VLAN 'Student bundle' 325 including VLANs 320A-320N. Since, there may be multiple VLANs with substantially similar priority rankings within a building or area and a VLAN bundle can be created, clients can be assigned to bundles rather than individual networks. A network bundle includes a sub-plurality of the plurality of VLANs. For example, the network bundle may include anywhere between two VLANs to the entire set of the plurality of VLANs. Thus, in other embodiments, the VLAN 'Math Bundle' 315 can include any sub-plurality of the VLANs 310A-N, including at least two of the VLANs 310A-N, up to all of the VLANs 310A-N.

In the example of FIG. 3, user 5 of the client device 312 is within range of the access point 308 and is thus coupled to the switch 306. Since user 5 is a student and a member of a math class, user 5 thus prefers the math network over the student network. User 5 can therefore be assigned to any one of the constituents (e.g., Math 310A-N) of the 'Math Bundle' 315. If the 'Math Bundle' 315 were not available, user 5 can then be assigned to any of the constituents (e.g., Student 320A-N) of the 'Student Bundle' 325. Further, since user 6 is an art student and that a network for art students is not available, the user 6 can be assigned to any of the constituents (e.g., Student 320A-N) of the 'Student Bundle' 325. The constituent VLANs (e.g., VLANs 320A-N) can be allocated to users based on load balancing. For example, each user to be assigned to the 'Student Bundle' 325 can be assigned, sequentially to each of the constituent networks 320A-N such that the load is evenly divided among the constituents. Other methods of load balancing within a bundle network is contemplated and do not deviate from the spirit of the novel art of the disclosure.

Figure 4A:
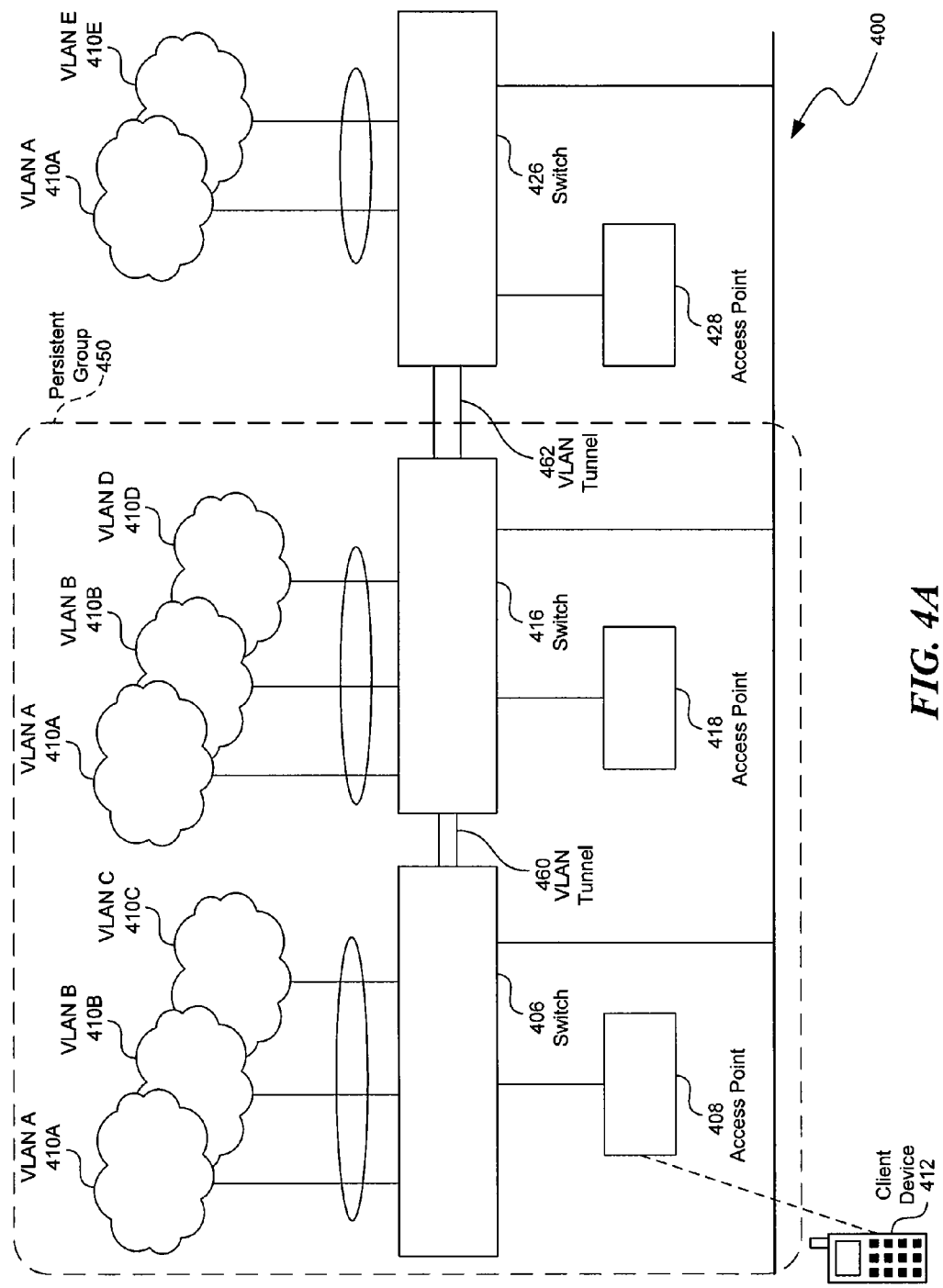
FIG. 4A illustrates an example of an implementation of a wireless local area network (WLAN) having a plurality of virtual local area networks (VLANs) with a client device within a range of a first access point.

FIG. 4A illustrates an example of an implementation of a wireless local area network (WLAN) having a plurality of virtual local area networks (VLANs) with a client device within a range of a first access point.

Figure 4B:
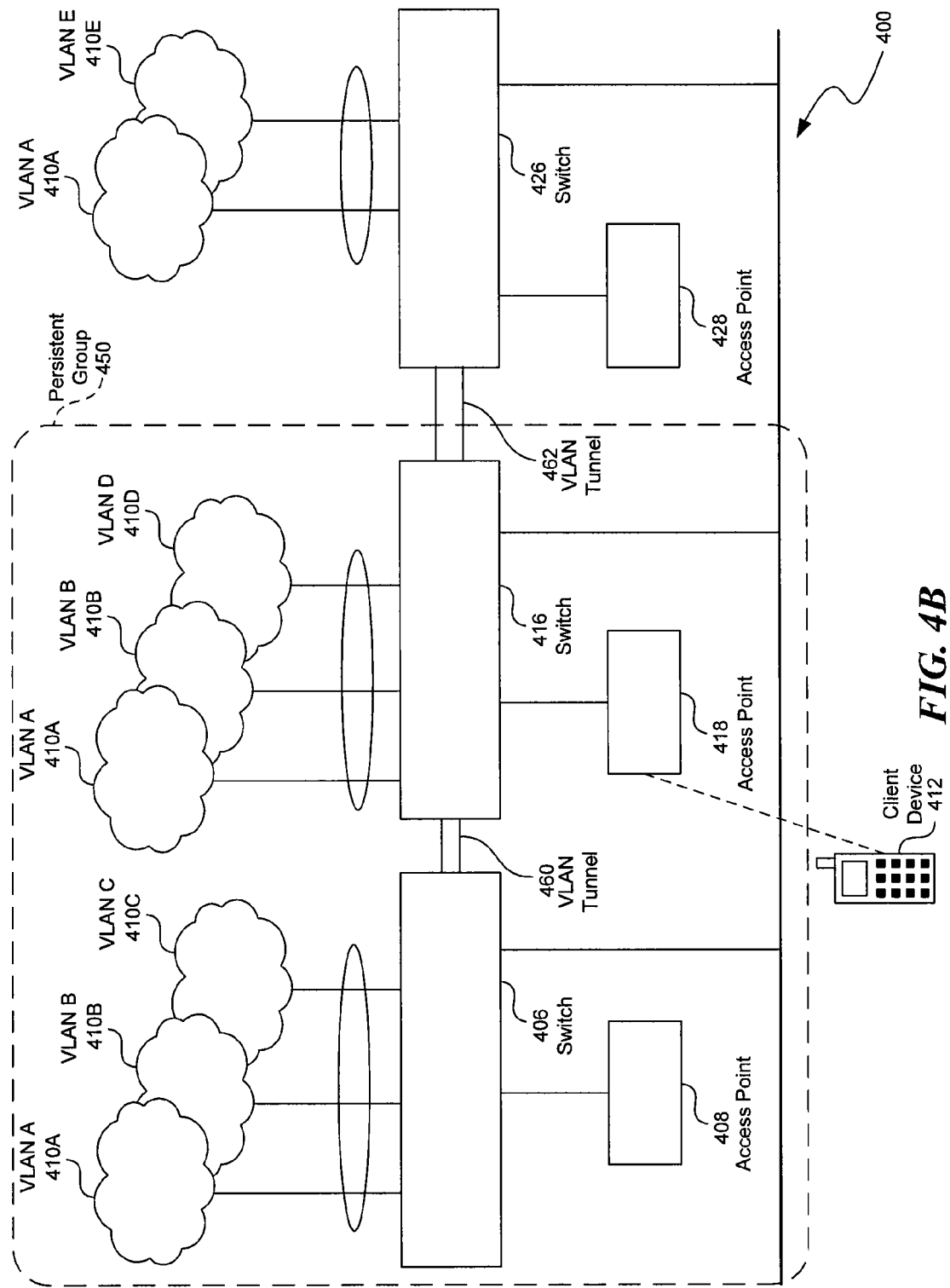
FIG. 4B illustrates an example of an implementation of a wireless local area network (WLAN) having a plurality of virtual local area networks (VLANs) with a client device within a range of a second access point.

FIG. 4B illustrates an example of an implementation of a wireless local area network (WLAN) having a plurality of virtual local area networks (VLANs) with a client device within a range of a second access point.

Figure 4C:
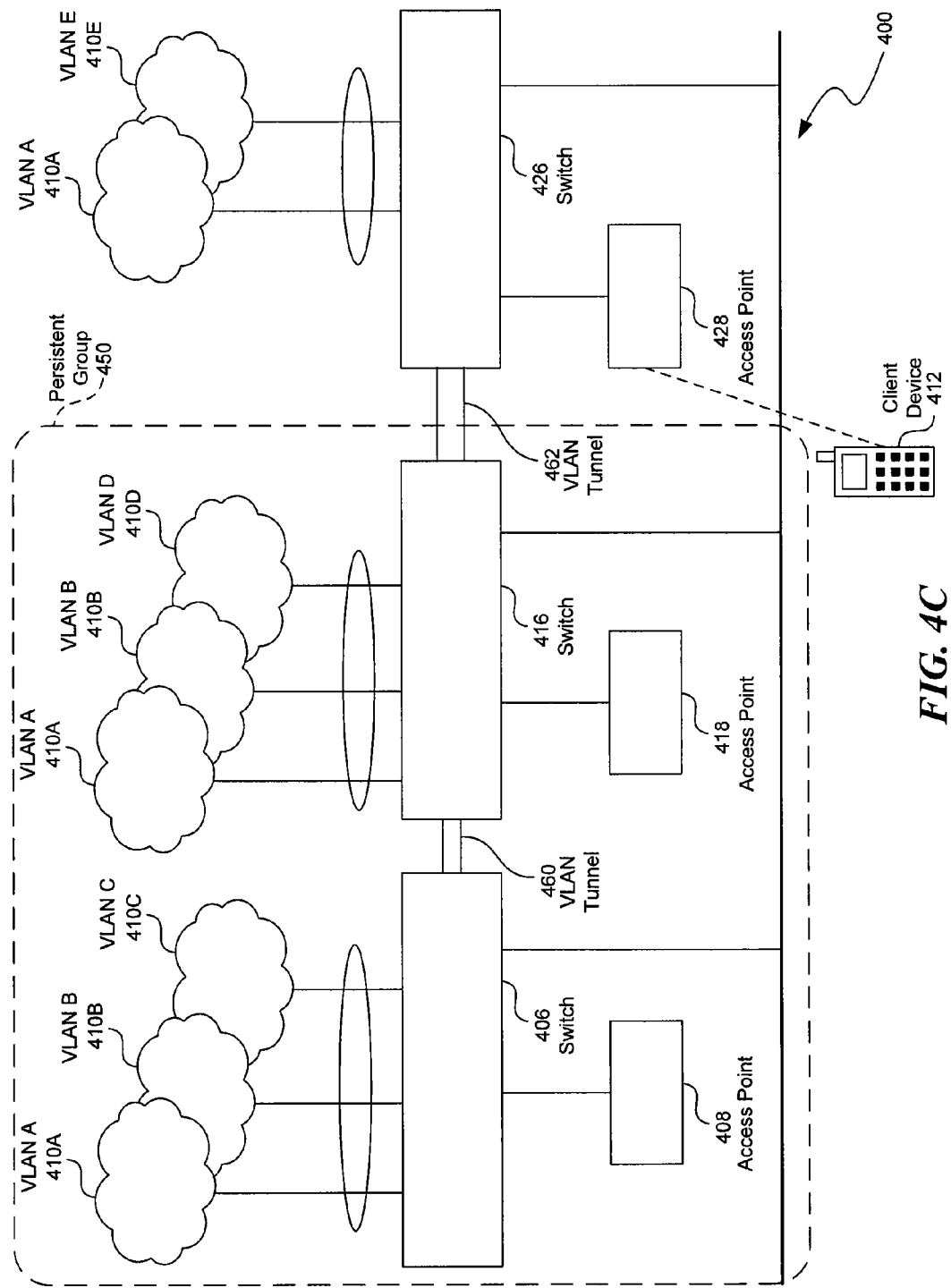
FIG. 4C illustrates an example of an implementation of a wireless local area network (WLAN) having a plurality of virtual local area networks (VLANs) with a client device within a range of a third access point.

FIG. 4C illustrates an example of an implementation of a wireless local area network (WLAN) having a plurality of virtual local area networks (VLANs) with a client device within a range of a third access point.

In general, roaming refers to the extension service to a subscriber in a location that is beyond the home location for which the service was originally registered for. For example, a client device can travel outside of a region of a first access point of a wireless switch and detected by a second access point. The client device can access an associated VLAN, for example, through a second access point, when an authentication procedure can be processed on the second switch to which the second access point is coupled to. The example below illustrates how network assignment based on priority can be achieved when a client device roams from one access point to another access point.

For example, a company physically spanning multiple floors of a building may utilize a number of network switches to provide connectivity to all floors. If an employee in the accounting department roams from a floor supported by one network switch to a second floor supported by another network switch, the membership of the employee in the VLAN for the accounting department can be maintained, in some instances, even if the network switch on the second floor provides a VLAN that is higher ranked on the employee's network priority preference list that is available for connection. In one embodiment, when a connection to a network switch that does not belong to the persistent group is established, the VLAN membership is assigned based on the network priority preference data of the client.

In one embodiment, a request from a client to connect to a first VLAN of a plurality of VLANs available for connection on a second network controller is received, where the client has roamed to within a range of an access point of the second network controller from an access point of a first network controller from a first access point where the client is currently coupled to the first VLAN associated with the first network controller. A persistent group of network controllers comprising a subset of network controllers of a set of network controllers can then be identified. If the persistent group of network controllers includes a first network controller through which the client is connected to the first VLAN, it is determined whether the second network controller is included in the persistent group as well.

If it is determined that the second network controller is comprised in the persistent group, a connection between the client and the first VLAN when the first VLAN is available for connection on the second network controller is established. If, however, the second network controller is not comprised in the persistent group, a connection between the client and a preferred VLAN based on the network priority preference data that is available for connection on the second network controller is established, when the first VLAN is unavailable for connection on the second network controller. Similarly, in response to determining that the second network controller is comprised in the persistent group and identifying that the first VLAN is not available for connection on the second network controller, a connection between the client and a preferred VLAN that is available for connection on the second network controller can be established, based on the priority preference data.

In the example of FIG. 4A-4C, a client device 412 is initially connected to switch 406 via access point 408 and connected to VLAN A, because VLAN A is the client's preferred network that is available for connection associated with switch 406. In some instances, when the client device 412 roams to another region within its presence is detectable by the access point 418 coupled to another switch (e.g., switch 416), maintaining an existing session on the same network (e.g., VLAN A) may be preferred, regardless if, a higher ranked network associated with switch 416 is available for connection, for example, to prevent service interruption from occurring. For example, if the client prefers VLAN D over VLAN A, and is available for connection on switch 416, the client device 412 connectivity can, in one embodiment, be maintained on VLAN A, since switch 406 and 416 belong in a persistent group 450.

If, however, the client device 412 moves to switch 426, as shown in the example of FIG. 4C, which is not a member of the persistent group 450, the client's priority preference for connecting to networks takes precedence. For example, if VLAN E is ranked higher than VLAN A, upon transfer to switch 426, the client device may be transferred to VLAN E, rather than VLAN A.

In another scenario, a VLAN may be highly preferred by a client. However, connection is not to be maintained via tunneling. In one embodiment, the network database and/or user database can be used to record whether persistent association is to be maintained via tunneling for a particular VLAN, and the circumstances under which tunnels are to be used for persistence association. In one embodiment, if it is determined that a preferred first VLAN is not available on the second network controller, where the client is within access range of, it is determined whether the preferred first VLAN is available for tunneling. If the preferred first VLAN is available for tunneling, a connection between the client and the preferred first VLAN can be established by VLAN tunneling to a network controller of which the preferred first VLAN is available. If the preferred first VLAN is not available for tunneling, a connection between the client and a preferred second VLAN based on the network priority preference data that is available for local connection on the second network controller can be established.

For example, if the client device is originally connected to VLAN E associated with switch 426 and roams to a region detectable by access point 408 associated with the switch 406, for which VLAN E is not available for connection. If, VLAN E is indicated as not to be available for tunneling connections, the client device then may connect to a preferred VLAN of VLANs A, B, and C, based on, for example, the client's network priority preference data.

In other embodiments, other precedence and rules can be applied for VLAN membership assignment without deviating from the spirit of the disclosure. Suppose that the client device is initially connected to VLAN C of the switch 406 and roams to a region within the detection range of access point 418 of the switch 416, VLAN C is no longer available for connection. Thus, in one embodiment, to prevent service disruptions, tunneling can be utilized to provide a connection to VLAN C managed by switch 406, while the user is coupled to switch 416, on which VLAN C is not available for local connection.

Tunneling can be available between various switches, within a persistent group, external to a persistent group, or across different persistent groups. A technique for achieving tunneling can be demonstrated in one example, by a system having a WAN, a first VLAN, a second VLAN, and a network database. The first VLAN, the second VLAN, and the network database are coupled to the WAN. The network database includes VLAN information. The network database may include VLAN information. Thus, then a client that is authorized on the second VLAN attempts to connect to the first VLAN, a network switch in the WAN can perform a lookup in the network database and determine that the client is authorized on the second VLAN. Since the second VLAN is associated with a switch different from the switch the client is currently connected to, the client can be connected to the second VLAN via tunneling.

VLAN tunneling (e.g., via tunnels 460 and 462) can be accomplished by using any convenient and/or known technique. For example, tunneling can be executed on the application layer, presentation layer, session layer, transport layer, network layer and/or data link layer in a data network system. Tunneling can be achieved using a variety of protocols, based on the network layer utilized. For example the DNA, TLS/SSL, TFTP, FTP, HTTP, IMAP, IRC, NNTP, POP3, SIP, SMTP, SNMP, SSH, TELNET, BitTorrent, RTP, rlogin, ENRP, TCP, UDP, DCCP, SCTP, IL, RUDP, IPv4, IPv6, ICMP, IGMP, ARP, RARP, Wi-Fi, Token ring, PPP, SLIP, FDDI, ATM, Frame Relay, and/or SMDS protocols. In other embodiments, additional layers and protocols can be used that facilitate VLAN tunneling.

Figure 5:
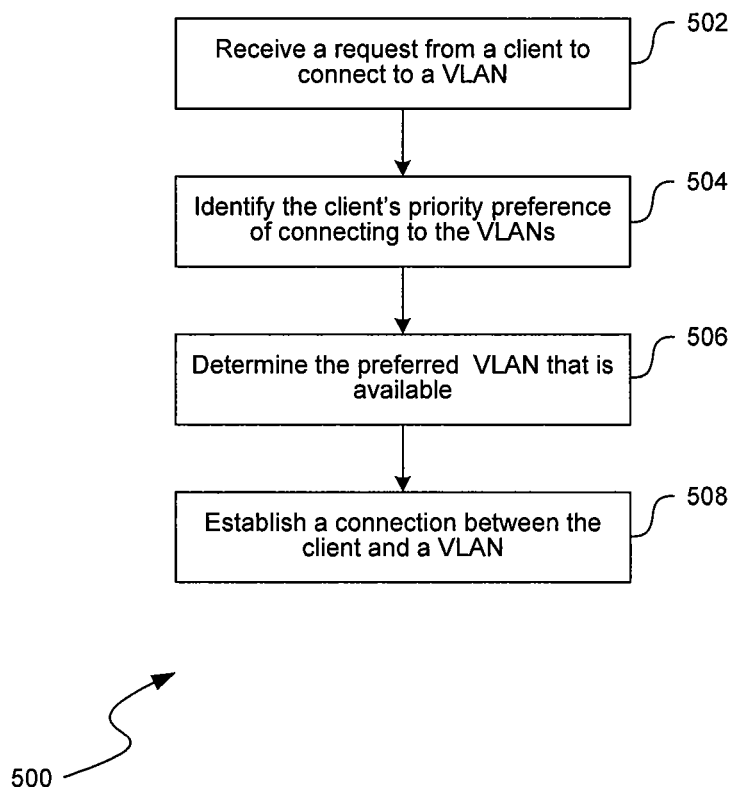
FIG. 5 depicts a flow chart illustrating an example of a process of establishing a connection between a client and a VLAN based on the client's priority preference.

FIG. 5 depicts a flow chart 500 illustrating an example of a process of establishing a connection between a client and a VLAN based on the client's priority preference.

In process 502, a request from a client to connect to a VLAN is received. The request can be identified by one of many mechanisms including, but not limited to, the user of the client device submitting a logon request by entering logon credentials, which may be correct or incorrect. The request may also be detected by an access point of an associated switch sensing the presence of a client device located within an operational range of the access point. In one embodiment, logon credentials may not be needed and the request for the client to connect to the VLAN can be processed upon detection of the client, within the range of one or more access points.

In process 504, the client's priority preference for connecting to the VLANs is identified. For example, once the request for connection is received, the client can be identified including various other user attributes such as user type, user preferences, client device type, etc. In one embodiment, the client information can be relayed from a network database and/or user database. Further, the network database may include, or the client may provide, the managing switch with the client's preference to connect to one or more VLANs. The client's preference can be specified in one or more of many ways that can be contemplated without deviating from the spirit of the novelty of this disclosure. For example, the client's preference may be placed on a list in a non-quantitative manner, or the preferences may be specified in a quantitative manner by assigning the one or more VLANs a score that is proportional to client preference.

In process 506, a preferred VLAN of the client that is available for connection is determined. In some embodiments, the preferred VLAN is determined based on the combination of preferences of the client to connect to a VLAN and the VLAN to connect to a client. The preference of the VLAN to establish connectivity to different clients may a preference for clients that can be connected locally rather than via tunneling. The preference of VLANs for connection to clients can further be utilized to distribute clients on different VLANS for the purposes of balancing the network traffic loads on the set of VLANs available for connection. For example, the rank that determines connectivity may, in some embodiments, be determined by the sum of the preference scores of a client to connect to a VLAN and a VLAN to connect to a client. In process 508, a connection is established between the client device and the preferred VLAN, based on a predetermined algorithm. In some instances, the preferred VLAN is the highest ranked VLAN by the client, which is available for connection, locally, or via tunneling.

Figure 6:
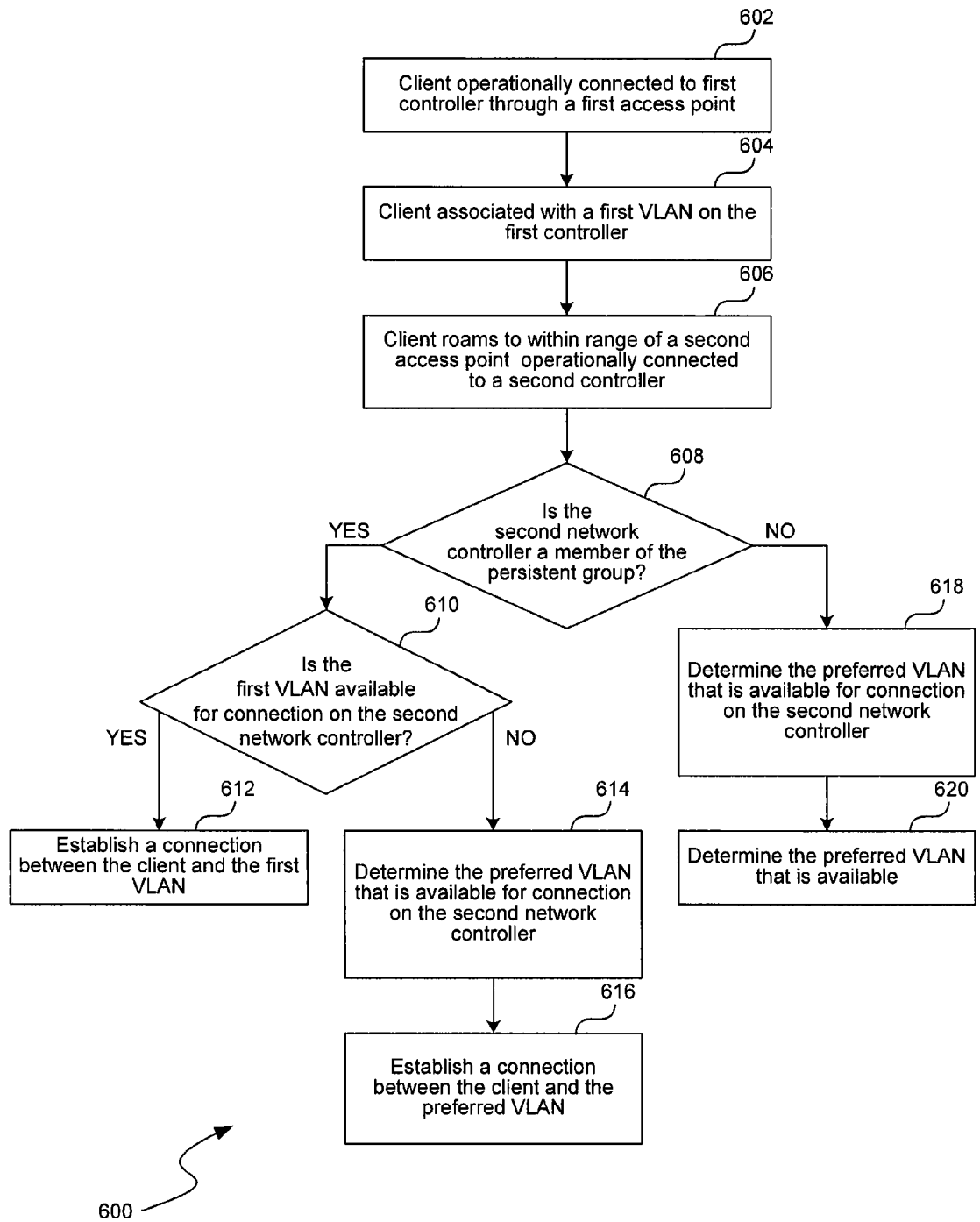
FIG. 6 depicts a flow chart illustrating an example of a process of establishing a connection between a client and a VLAN based on the client's priority preference, in particular, establishing a connection in persistent network groups.

FIG. 6 depicts a flow chart 600 illustrating an example of a process of establishing a connection between a client and a VLAN based on the client's priority preference, in particular, establishing a connection in persistent network groups.

In one embodiment, a set of network controllers that are members of a persistent group can be initially identified. In a persistent group, VLAN associations can be maintained, across different access points that are coupled with different switches when a client roams from an access region of a first access point to an access region of a second access point. By maintaining VLAN associations, wireless service interruptions can be circumvented when a client roams between different access points for different switches for which different VLANs may be available for connection. In process 602, a request to connect to the first VLAN is received from the client and the client is thus operationally connected to a first VLAN on a first network controller, which is a member of the persistent group. The client is then, in process 604, associated with a first VLAN of the first controller. The request can be identified by one of many mechanisms including, but not limited to, the user of the client device submitting a logon request by submitting logon credentials, which may be correct or incorrect. The request may also be identified by an access point of an associated switch detecting the presence of the client device located within the range of the access point. In one embodiment, logon credentials may not be needed and the request for the client to connect to the VLAN can be processed upon detection of the client.

The client's priority preference for connecting to the VLANs can then be identified. For example, when the request for connection is received, the client can be identified including various other user attributes such as user type, user preferences, client device type, etc. In one embodiment, the client information can be relayed from a network database. Further, the network database may include, or the client may provide, the managing switch with the client's preference to connect to one or more VLANs. The client's preference can be specified in one or more of many ways that can be contemplated without deviating from the spirit of this disclosure. For example, the client's preference may be placed on a list in a non-quantitative manner, or the preferences may be specified in a quantitative manner by assigning the one or more VLANs a score that is proportional to client preference.

In process 606, the client roams to within range of a second access point operationally connected to a second controller. Similarly, the client can be detected one of many mechanisms including, but not limited to, the user of the client device submitting a logon request by submitting logon credentials, which may be correct or incorrect. The presence of the client may also be identified by the access point of the associated second controller detecting the presence of the client device located within the range of the access point. In one embodiment, logon credentials may not be needed and the request for the client to connect to the VLAN can be processed upon detection of the client, within the range of one or more access points.

In process 608, membership of the second network controller in the persistence group is determined. If the second network controller is a member of the persistence group, availability of the first VLAN on the second network controller is determined, in process 610. If the first VLAN is available for connection on the second network controller, a connection between the client and the first VLAN is established in process 612. If, instead, the first VLAN is not available for connection on the second network controller, as determined in process 610, the preferred VLAN that is available for connection on the second network controller is determined, in process 614. In process 616, a connection between the client and the preferred VLAN available is established.

If, in process 608, the second network controller is determined to not be a member of the persistent group, the preferred VLAN that is available for connection on the second network controller is determined, in process 618. In process 620, a connection between the client and the preferred VLAN is established. The preferred VLAN, can in some instances be the highest ranked VLAN by the client on the network priority preference list that is available for connection. The preferred VLAN, can, in some embodiments, be further determined by VLAN traffic load, where the client may be assigned to VLANs of similar (or same) rankings to balance the traffic load of one or more VLANs.

Figure 7:
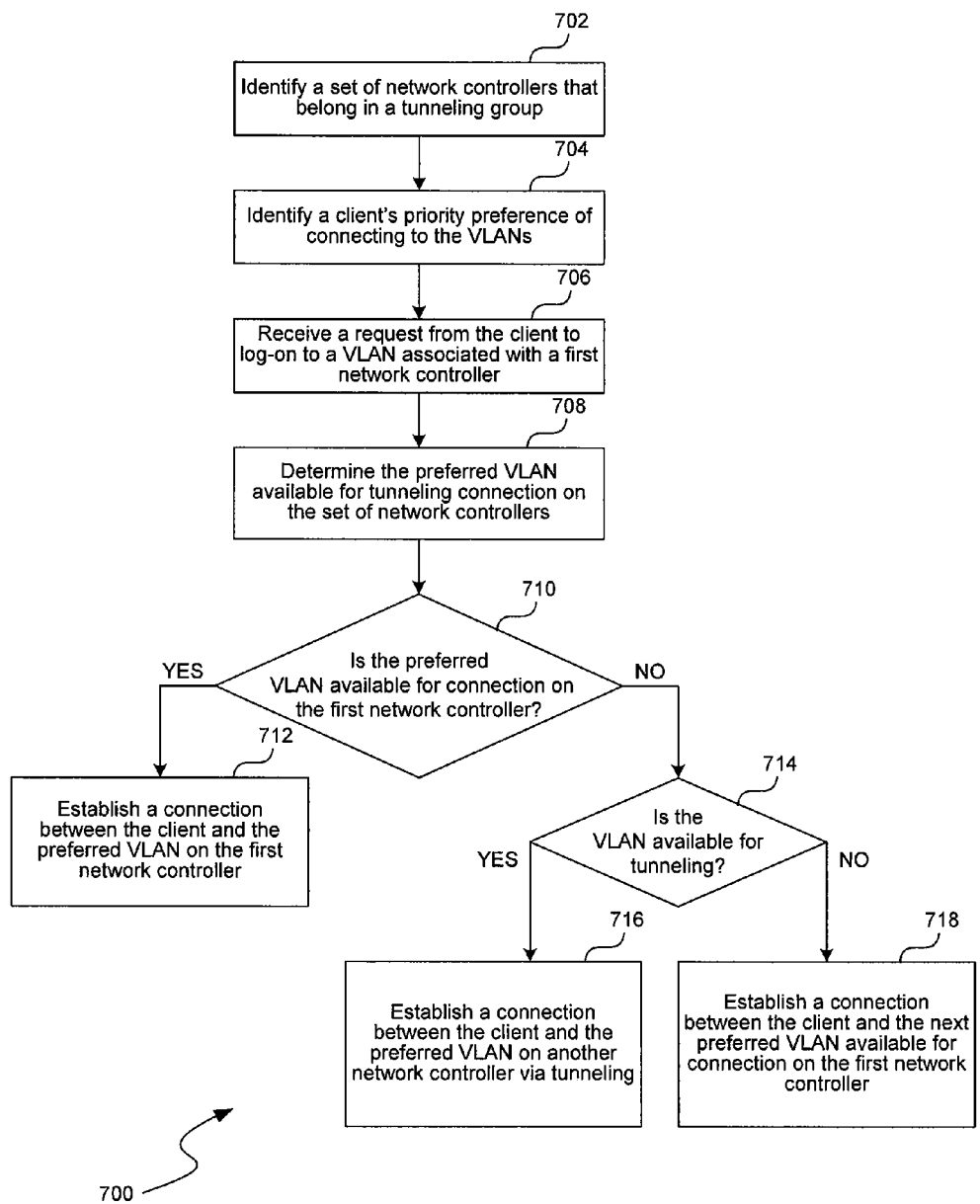
FIG. 7 depicts a flow chart illustrating an example of a process of establishing a connection between a client and a VLAN based on the client's priority preference, in particular, establishing a connection in tunneling-enabled network groups.

FIG. 7 depicts a flow chart 700 illustrating an example of a process of establishing a connection between a client and a VLAN based on the client's priority preference, in particular, establishing a connection in tunneling-enabled network groups.

In process 702, a set of network controllers belonging in a tunneling group is identified. Within a tunneling group, when a client device migrates (e.g., roams) from an access point associated with a first network switch to another access point associated with a network switch, a tunneling connection, can be made, in some instances from the second access point to a VLAN that is available for connection associated with the first access point of the first network switch. For example, if a first VLAN that the client is connected to on the first network switch is indicated (e.g., by the network database) to be available for receiving tunneled connections, when the client roams to a region of a second access point coupled to a network switch for which the first VLAN is not available, the client device may tunnel to the first VLAN from the second access point, such that service interruption instances are mitigated.

In process 704, a client's priority preference for connecting to the VLANs is determined. For example, once the request for connection is received, the client can be identified including various other user attributes such as user type, user preferences, client device type, etc. In one embodiment, the client information can be relayed from a network database. Further, the network database may include, or the client may provide, the managing switch with the client's preference to connect to one or more VLANs. The client's preference can be specified in one or more of many ways that can be contemplated without deviating from the spirit of the novel art of this disclosure. For example, the client's preference may be placed on a list in a non-quantitative manner, or the preferences may be specified in a quantitative manner by assigning the one or more VLANs a score that is proportional to client preference.

In process 706, a request to log-on to a VLAN associated with a first network controller is received from the client. The request can be identified via one of many mechanisms including, but not limited to, the user of the client device submitting a logon request by submitting logon credentials, which may be correct or incorrect. The request may also be identified by an access point of an associated switch detecting the presence of the client device located within the range of the access point. In one embodiment, logon credentials may not be needed and the request for the client to connect to the VLAN can be processed upon detection of the client, within the range of one or more access points.

In process 708, the preferred VLAN that is available for connection in the set of network controllers in determined. The preferred VLAN, can in some instances be the highest ranked VLAN by the client on the network priority preference list that is available for connection. The preferred VLAN, can, in some embodiments, be further determined by VLAN traffic load, where the client may be assigned to VLANs of similar (or same) rankings to balance the traffic load of one or more VLANs. In process 710, the availability of the preferred VLAN identified in process 708 on the first network controller is determined. If available, in process 712, a connection between the client and the preferred VLAN on the first network controller is established.

If, instead, the preferred VLAN is not available for connection on the first network controller as determined in process 710, the availability of the preferred VLAN for receiving a tunneled connection is determined, in process 714. If the VLAN is available to receive tunneling connections, a connection between the client and the preferred VLAN is established on another network controller that provides connectivity to the preferred VLAN. In process 718, if the preferred VLAN is not available for receiving a tunneled connection, a connection is established between the client and the preferred VLAN that is locally available for connection on the first network controller.

Although embodiments have been described with reference to specific embodiments, it will be evident that the various modification and changes can be made to these embodiments. Accordingly, the specification and drawings are to be regarded in an illustrative sense rather than in a restrictive sense. The foregoing specification provides a description with reference to specific embodiments. It will be evident that various modifications may be made thereto without departing from the broader spirit and scope as set forth in the following claims. The specification and drawings are, accordingly, to be regarded in an illustrative sense rather than a restrictive sense.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the invention. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method, comprising:
   receiving, from a client being (1) operationally connected to a second virtual local area network (VLAN) via a first access point, and (2) roaming from the first access point to a second access point, a request to operationally connect to a VLAN from a plurality of VLANs, the plurality of VLANs including a first VLAN and the second VLAN;
   identifying network priority preference data of the client authorized to connect to both of the first VLAN the second VLAN, the network priority preference data indicating a preference of the client to connect to the first VLAN, the first VLAN being a highest preferred VLAN indicated by the network priority preference data that is available; and
   if the first VLAN is available and the second VLAN is available, maintaining an operational connection between the client and the second VLAN.

2. The method of claim 1, further comprising establishing (1) a first network bundle comprising the first VLAN and (2) a second network bundle comprising the second VLAN.

3. A system, comprising:
   a means for receiving a request from a client to operationally connect to a virtual local area network (VLAN) of a plurality of VLANs, the client having roamed to within a range of a second access point of the second network controller from a first access point of a first network controller, where the client is coupled to a first VLAN via the first access point of the first network controller when roaming within the range of the second access point;
   a means for identifying network priority preference data associated with the client to operationally connect to one or more VLANs of the plurality of VLANs where a second VLAN has a higher priority than the first VLAN;
   a means for identifying a persistent group of network controllers including the first network controller;
   a means for determining whether the persistent group of network controllers includes the second network controller; and
   a means for maintaining connectivity from the second network controller to the first network controller between the client and the first VLAN, despite the second VLAN having higher priority than the first VLAN for the client, when connectivity to the first VLAN is available through the second network controller.

4. The system of claim 3, further comprising, a means for maintaining connectivity between the client and the first VLAN when the first VLAN is available at the second network controller, in response to determining that the second network controller is comprised in the persistent group.

5. The system of claim 3, further comprising a means for establishing an operational connection between the client and a preferred VLAN, based on the network priority preference data, that is available at the second network controller when the first VLAN is unavailable at the second network controller, in response to determining that the second network controller is not comprised in the persistent group.

6. The system of claim 3, further comprising a means for in response to determining that the second network controller is comprised in the persistent group and identifying that the first VLAN is not available at the second network controller, establishing an operational connection between the client and a preferred VLAN that is available at the second network controller, based on the priority preference data.

7. The system of claim 3, further comprising a means for, in response to determining that the first VLAN is not available at the second network controller, determining whether the first VLAN is available for tunneling.

8. The system of claim 3, further comprising a means for, in response to determining that the first VLAN is not available at the second network controller, and determining that the first VLAN is available for tunneling, establishing an operational connection between the client and the first VLAN by VLAN tunneling to a network controller of which the first VLAN is available for tunneling.

9. The system of claim 3, further comprising a means for, in response to determining that the first VLAN is not available at the second network controller, and determining that the first VLAN is not available for tunneling, establishing an operational connection between the client and a preferred VLAN based on the network priority preference data that is available at the second network controller.

10. The system of claim 3, wherein the second VLAN is the highest ranked VLAN that is available based on the network priority preference data.

11. The system of claim 3, wherein the first network controller includes a network switch and the second network controller includes a network switch.

12. A system, comprising:
    a network switch configured to be operatively coupled to a network database storing network priority preference data of a client that is authorized to connect to (1) a first VLAN, (2) a second VLAN, and (3) a third VLAN, and authorized to roam from the first access point to a second access point;
    the network switch is configured to lookup the network priority preference data of the client in the network database; the network priority preference data indicating a preference to connect to the first VLAN before connecting to either the second VLAN or the third VLAN;
    if the first VLAN is available and the second VLAN is available, the network switch is configured to maintain an operational connection between the client and the second VLAN.

13. The system of claim 12, wherein the network switch is a first network switch, further comprising a second network switch configured to be operatively coupled to the network database, the client is configured to be authorized to connect to both of a third VLAN a fourth VLAN.

14. The system of claim 13, wherein, in operation, if the client roams to within range of an access point associated with the second network switch, the second network switch is configured to lookup the network priority preference data of the client in the network database; the network priority preference data indicating a preference to connect to the third VLAN.

15. The system of claim 13, wherein
the network switch is configured to maintain the operational connection between the client and the second VLAN via tunneling.

\* \* \* \* \*